United States Patent Office 3,321,231
Patented May 23, 1967

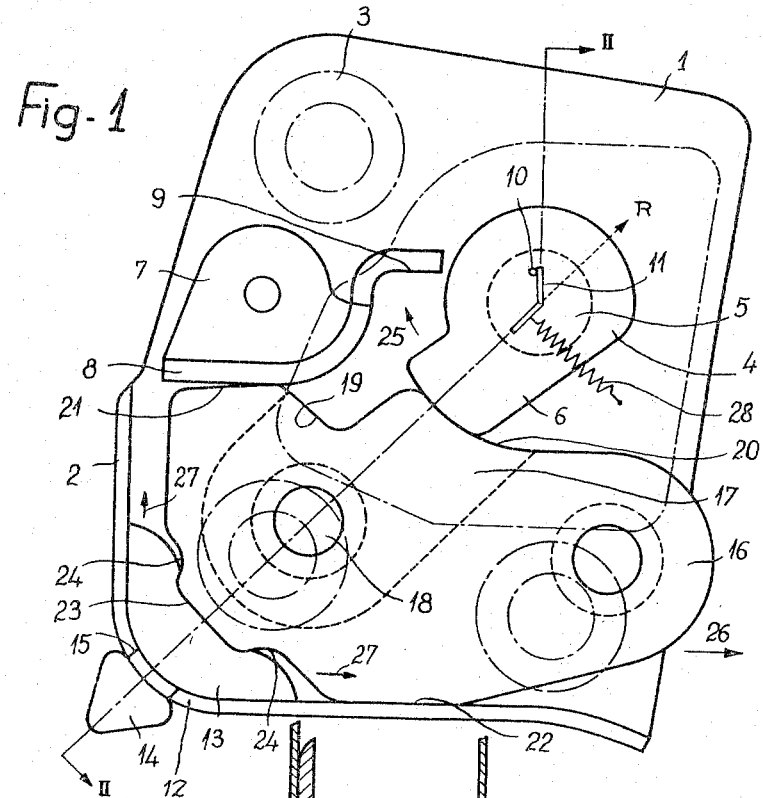
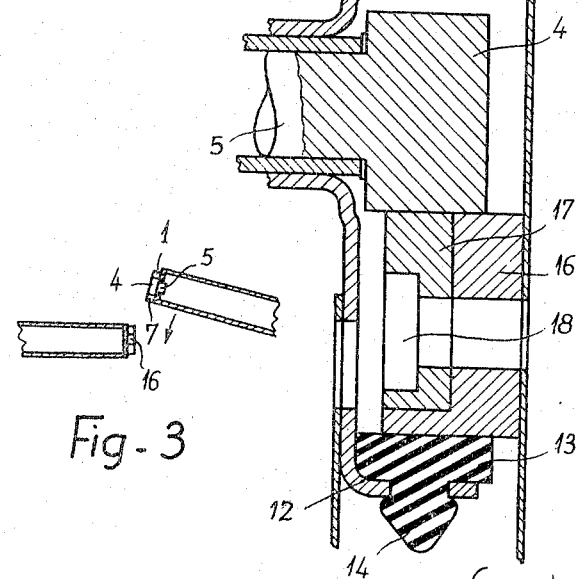

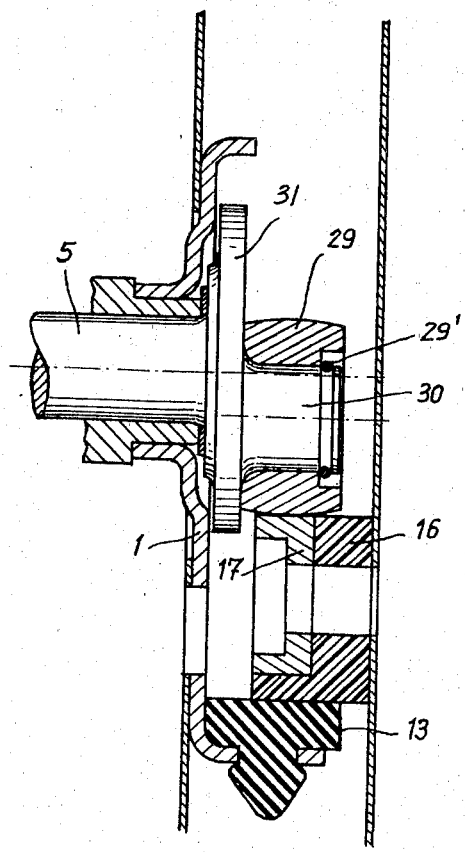

3,321,231
DOOR LOCKS, NOTABLY FOR VEHICLES
Gaetan de Coye de Castelet, Billancourt, France, assignor to Regie Nationale des Usines Renault, Billancourt, France
Filed May 3, 1965, Ser. No. 452,474
Claims priority, application France, May 9, 1964, 973,896, Patent 1,403,097; Aug. 19, 1964, 985,591, Patent 86,339
5 Claims. (Cl. 292—198)

This invention relates to a door lock intended notably for automobile vehicles and more particularly to a lock of the type adapted to be mounted as a wall-fitting device on overlapping portions of the door frame and of the door proper.

With this lock the following different results may be obtained:

Centering the door when closing same;
Wedging the closed door to take up looseness due to manufacturing differences and damp out vibrations;
Facilitating the opening in spite of the considerable compressive force exerted on the weather strips;
Safety of operation and provision of a safety-catch;
Simplicity of manufacture to minimize cost and facilitate the fitting operation.

This lock consists of:

(i) A plate supporting the bolt pivot mechanism and means for centering the lock and taking up play, which are secured as a rule on the door;

(ii) a keeper secured as a rule on the doorframe and adapted to co-act with said bolt and said centering and play take-up means.

According to an alternate form of embodiment, the bolt consists of a roller or like member mounted eccentrically on the bolt control member and retained in position by a spring ring.

A lock according to this invention will now be described with reference to the accompanying drawings, in which:

FIGURE 1 is an elevational view of the plate assembly with the lock and keeper in relative engagement;

FIGURE 2 is a section taken upon the line II—II of FIGURE 1;

FIGURE 3 is a diagrammatic view showing the lock fitted on a door, as seen in horizontal section, and FIGURE 4 is a section taken upon a plane at right angles to the lock plate to show an alternate form of embodiment of the bolt.

Referring first to FIGURES 1 and 2 of the drawings, the lock plate 1 consists of a sheet-metal member having upturned lower edges 2 and 12 and three holes 3 for the passage of lock fastening screws. The bolt 4 is pivotally mounted on a pin 5 responsive to conventional control means (not shown). This bolt is provided with a radial projection 6 forming the operative surface of the bolt.

A pressed-steel metal member 7 secured on the plate is formed with two abutment faces 8 and 9 respectively for centering the keeper and limiting the bolt stroke in the opening direction. In this exemplary form of embodiment the bolt stroke in the opposite (closing) direction is normally limited by the bolt control means (not shown). However, to simplify the description these control means are depicted diagrammatically in the form of stop members 10, 11 and a spring 28 urging the bolt to the abutment position.

A rubber shock stop member 13 is secured with the assistance of an integral stud 14 inserted in the hole 15 of plate 1 in the left-hand lower corner of this plate 1.

The keeper, of which the general configuration is visible in the drawings, comprises two component elements, namely a plastic member 16 and a metal insert 17. This insert 17 is embedded in a corresponding cavity of the plastic member and held therein by the keeper fastening screw 18; it is formed on its upper face with a pair of notches 19, 20 acting respectively as safety-catch and locking catch, both adapted to be engaged by the bolt 6.

The plastic member 16 is formed edgewise with two surfaces 21, 22 for guiding and centering purposes in the closed-door position, these surfaces being adapted to be engaged respectively by the abutment face 8 and the lower portion of edge 12, and another surface 23 adapted to compress the rubber shock stop 13 in the direction of the arrows 27 in case of strong compressive efforts. Clearance shoulders 24 are located on both sides of said surface 23 and allow for the outward expansion of the rubber shock stop 13 due to compression of the central portion thereof.

This lock operates as follows:

Firstly, it should be reminded that this lock is intended for mounting on overlapping portions of the door-frame and door proper, as shown in FIGURE 3.

(A) *Opening.*—FIGURE 1 illustrates the lock in the closed position. To open the lock the bolt 6 is pivoted in the direction of the arrow 25 until it strikes the abutment face 9; then the keeper can be released in the direction of the arrow 26. It will be noted that in the closed position the reaction R of the door which is due to the resilient reaction of the weatherstrips and of the shock stop 13 is exerted along a line passing through the axis of the pivoting movement of the lock; therefore, the effort necessary to open the lock is particularly moderate.

(B) *Closing.*—The keeper, initially positioned on the right-hand side of lock plate 1 and moving in a direction opposite to that of arrow 26 lifts the bolt which is thus caused to pivot in the direction of the arrow 25, then its surfaces 21 and 22 wedge themselves between the abutment face 8 and the ledge 2 in order to properly center the door. During this movement the bolt responsive to its return spring 28 drops firstly into the safety-catch or notch 19 and then in the closing notch 20 of the keeper, and the keeper surface 23 will strongly compress the shock stop 13. The door is locked in this last position with the bolt compression reaction R passing through its axis of rotation.

It will be noted that during this closing movement the keeper is guided and centered by frictional engagement with the surfaces 21 and 22 of the plastic member; therefore, a self-lubricating and possibly slightly resilient composition is preferred for this part; it will also be noted that the bolt action is exerted on the notches 19 and 20 of the metal insert, the provision of this insert thus increasing considerably the useful life of the lock.

On the other hand, the ledges 2 and 12 of plates 1 and abutment surface 8 of member 7, as well as the thickness of the bolt make this lock practically tamper-proof from the outside by preventing the introduction of a tool edgewise.

In the alternate form of embodiment illustrated in FIGURE 4 the lock plate 1 has the bolt mounted thereon; this bolt consists of a roller or like member 29 rotatably mounted on an eccentric pin 30 carried by a flange 31 rigid with the shaft 5 actuated by conventional bolt control means (not shown). This roller 29 is retained on the eccentric pin 30 by a spring ring $29^1$.

The keeper of this modified form of embodiment still consists of two component elements, namely a plastic member 16 and a metal insert 17 as in the preceding example. The rubber shock stop 13 is fitted in the lower corner of the plate.

The use of this roller-type bolt facilitates the lock operation by reducing the frictional contact between the bolt and the keeper.

The bolt-forming roller may be made from metal or plastic material according to the degree of frictional contact and the noise requirements permitting a proper operation, and also to the nature of the corresponding working surface of the keeper.

I claim:
1. A door lock, notably for the doors of automobile vehicles, comprising a lock plate, a bolt, a bolt pivot means and keeper centering and guide means all of which are mounted on said lock plate, and a keeper, said bolt and said keeper being mounted one on the doorframe and the other on the door proper, said lock plate comprising first and second abutment members, said first abutment member consisting of resilient material, said second abutment member consisting of a pair of spaced opposing flanges, said keeper being formed with surfaces for engaging between the flanges of said second abutment member and with said first abutment member, said bolt and said lock plate the parts being positioned and formed so that when said keeper is engaged by said bolt and said bolt pivot means, the interengaging portions of said bolt and keeper, and the interengaging portions of said first abutment member and keeper lie substantially along a straight line.

2. A door lock according to claim 1, in which said resilient abutment member is fitted in a corner of said lock plate opposite the keeper inlet, said resilient abutment member being at an angle with respect to a longitudinal axis of said keeper whereby the bearing reaction of said keeper on said first abutment member is directed substantially along said straight line leading through the axis of the bolt pivot means.

3. A door lock according to claim 1, in which said keeper is made from plastic material, a metal insert in said keeper having surfaces therein for cooperating with said bolt.

4. A door lock according to claim 1 in which the keeper surface engaging said resilient abutment member has clearance shoulders formed on both sides thereof.

5. A door lock according to claim 1, wherein said bolt consists of a roller mounted eccentrically on a bolt control member in order to reduce the frictional contact between said bolt and said keeper as a consequence of the reaction produced by the abutment members.

References Cited by the Examiner
UNITED STATES PATENTS

| | | |
|---|---|---|
| 1,840,061 | 1/1932 | Stutson. |
| 2,893,774 | 7/1959 | Carpenter _____ 292—280 |
| 2,987,336 | 6/1961 | Kramer _____ 292—341.12 X |
| 3,002,369 | 10/1961 | Chanaryn et al. |
| 3,130,997 | 4/1964 | Kirk. |
| 3,206,240 | 9/1965 | Roethel _____ 292—341.12 X |

MARVIN A. CHAMPION, *Primary Examiner.*

R. E. MOORE, *Assistant Examiner.*